Aug. 8, 1972  E. ANDERSON ET AL  3,682,606
ALUMINUM-STEEL COMPOSITE

Filed Aug. 20, 1969  2 Sheets-Sheet 1

FIG. I

INVENTORS
ERIC ANDERSON - JOHN SPREADBOROUGH
BY
M°Dougall, Hersh, Scott & Ladd
ATTYS.

United States Patent Office 3,682,606
Patented Aug. 8, 1972

3,682,606
ALUMINUM-STEEL COMPOSITE
Eric Anderson, Geneva, Switzerland, and John Spreadborough, Windsor Berks, Grand Bretagne, England, assignors to Pechiney Ugine Kuhlmann, Paris, France
Filed Aug. 20, 1969, Ser. No. 851,612
Claims priority, application France, Aug. 22, 1968, 163,730
Int. Cl. B23p 3/02
U.S. Cl. 29—196.2                                    11 Claims

ABSTRACT OF THE DISCLOSURE

An aluminum-steel composite and method for producing same wherein a matrix comprising at least two sheets of aluminum is internally reinforced with a plurality of layers of a plurality of thin steel strips, wherein the layers may or may not be separated by one or more sheets of aluminum, and the resulting matrix is subjected to elevated pressure to form an intermetallic bond between the sheets and the strips to provide a composite having substantially isotropic properties.

---

This invention relates to a composite aluminum-steel material formed by a matrix of aluminum or an aluminum alloy which is internally reinforced by steel strips.

Composite materials formed by a first material having poor mechanical characteristics but having other desirable properties, and by a second material having superior mechanical properties to reinforce the first material, are known to the art. The second material is generally introduced to a matrix of the first in the form of fibers, generally in the form of thread-like substances having a generally circular cross-section.

In fiber-reinforced composite materials, the reinforcement of the matrix is highly anistropic in that the mechanical characteristics of the matrix in traction, for example, are increased only in the direction in which the fibers extend, whereas the mechanical traction characteristics in a direction transverse to that in the fibers extend remain essentially unchanged. It has been proposed to reinforce such matrices in two or three directions by dispersing in the matrix fibers extending in various directions. However, such proposals have met with little or no success because the quantity of fibers which can be introduced to reinforce the matrix in a given direction is limited, and the reinforcement in that direction is much less than that which could be obtained by orienting all of the fibers in the same direction.

In the prior art, aluminum alloys, which have highly desirable properties, such as lightness and high corrosion resistance, have been reinforced by steel fibers, all of which have been oriented in the same direction with the result that substantial reinforcement is effected only in the direction in which the fibers extend.

It is the object of the present invention to provide a composite which overcomes the aforegoing disadvantages of the prior art.

It is another object of the present invention to provide a composite having substantially isotropic characteristics whereby the reinforcement of the matrix is substantially the same in a direction transverse to the direction of the reinforcing members as in the longitudinal direction of the reinforcing members.

It is a further object of the invention to provide a method for producing composites having the improved characteristics set forth herein.

These and other objects and advantages of the invention will appear hereinafter, and, for purposes of illustration, but not of limitation, an embodiment of the invention is shown in the accompanying drawing in which.

The concept of the present invention resides in an aluminum matrix which is internally reinforced by a plurality of parallel and superposed layers of thin steel strips, wherein the thickness of the strips, which is preferably less than 0.5 mm., ranges from $\frac{1}{15}$ to $\frac{1}{300}$ times their width. The matrix comprises at least two superposed layers of aluminum, which are separated from each other by a plurality of layers of thin strips. The strips of each layer are in parallel juxtaposition, and the direction in which the strips extend in a given layer may be either parallel or transverse to the direction of the strips in adjacent layers. It is generally preferred that the steel strips constitute between 10% and 70% by volume of the volume of the matrix, with the most preferred range being 20% to 50% by volume.

The bond between the steel strips and the aluminum is preferably a metallurgical bond, and is preferably produced by the interdiffusion of the metals at their interface, with the thickness of weaker intermetallic compounds of the Fe2Al5 type, which may be formed at the interface as a result of the interdiffusion, being no more than two microns. The steel strips employed in forming the composites of the present invention are preferably those of the type described in French patent application No. 163,729, filed in France on Aug. 22, 1968, wherein description is made of thin steel strips encased in aluminum or aluminum alloys.

Composite materials embodying the concepts of the invention exhibit the unexpected characteristic that the extent of reinforcement in a direction parallel to the axis of the thin steel strips is equivalent to that obtained by the use of fibers, and the extent of reinforcement in a direction perpendicular to the axis of the strips and to the plane of the strips is almost as great. It will be understood that, as used therein, the term "aluminum" is used and meant to include alloys of aluminum as well as aluminum itself.

Figure 1:
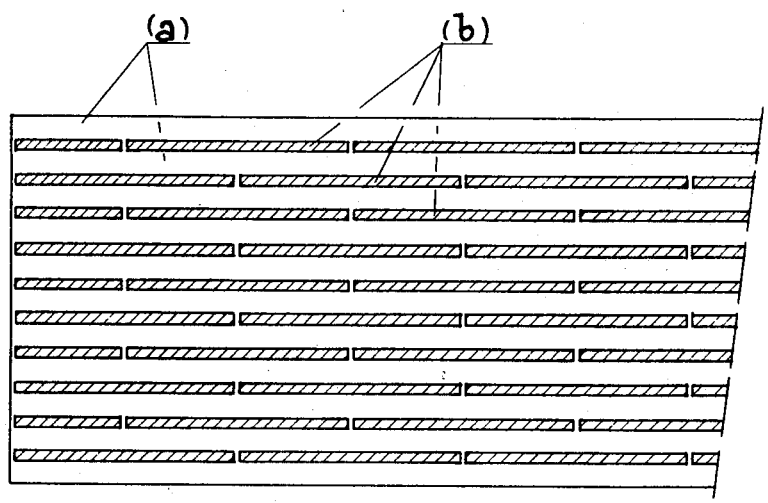
FIG. 1 is a cross-sectional view of a portion of a composite embodying the features of the invention.

Referring now to FIG. 1, there is shown an exposed view of the interior of a composite according to the present invention. There is provided a continuous layer $a$ or sheet of aluminum having a plurality of thick strips $b$ on its surface. As shown, the strips are positioned in a plurality of superposed layers arranged in a parallel side-by-side relation. It is generally preferred that the ends of the strips be staggered so that the end of one strip is not adjacent to the end of the adjacent strip. It will be appreciated that the thin strips $b$ may be a plurality of layers of thin strips wherein each layer is separated from an adjacent layer by an additional layer of aluminum.

It has been found that the maximum traction rupture strength, herein designated as Rc, in a direction transverse to the direction of the thin steel strips may be empirically determined by the following formula:

$$Rc = Rr \cdot Vr \left(1 - \frac{kl}{L}\right) + Em(1 - Vr) \tag{1}$$

wherein L is the width of the strips, $l$ is the critical width of the strips, which depends upon the materials to be used and the quality of the bond between the materials, Rr is the rupture strength of the steel strips used, Vr is the ratio by volume of the composite, Em is the elasticity limit of the matrix and $k$ is a constant, which is generally equal to approximately 0.5.

The same formula may be used to evaluate a maximum transverse rupture strength R in the longitudinal direction of the steel strips wherein $k$ is zero, whereby Formula 1 becomes $$R = Rr \cdot Vr + Em(l - Vr) \qquad (2)$$

It will be seen by comparing Formulas 1 and 2 that, as the ratio $L/l$ increases, the strength of the composite in the transverse direction (Rc) approaches the strength in the longitudinal direction (R). Accordingly, when a high $L/l$ ratio is used, it is unnecessary to provide strips in one layer that extend in a direction transverse to the strips in another layer.

It has also been found that the value of the critical widths can be determined in accordance with the formula $$l = d \cdot (Rr/t) \qquad (3)$$

wherein $d$ denotes the thickness of the strip, and $t$ denotes the shearing strength of the matrix or the strip-matrix interface.

While it is desirable to provide a composite having a high strength Rc in a direction transverse to the longitudinal direction of the steel strips by using strips having a width L greater than critical width $l$, it is also desirable to provide a composite material having a high resistance to crack propagation. It has been found that when steels having sensitivity to cracking are used, the width L and the thickness $d$ of the strips should not exceed certain limits in order that a composite material according to the invention will possess a high degree of resistance to crack propagation which is greater than that of the steels used in reinforcing the composite matrix. Thus, in accordance with the preferred embodiment, width L of the strips ranges from about 30 to 200 times their thickness $d$, with the thickness $d$ being in the range 0.05 to 0.15 mm.

The steel to be used in forming the thin steel strips is preferably a stainless steel having superior mechanical characteristics, or a martensite steel, a maraging steel or a steel having a good cold-shaping capacity. The aluminum alloy to be used in forming the matrix is preferably an alloy of the Al-Si type, or an alloy capable of being hardened of the Al-Zn-Mg, Al-Cu-Mg, Al-Mg-Si or Al-Zn-Mg-Cu types.

The method by which the steel strips and aluminum layers are bonded together has a significant influence on the mechanical properties of the composite material. As noted, it has been found that if there exists at the steel-aluminum interface a layer of intermetallic compounds of the Fe2Al5 type having a thickness greater than about two microns, the bond will be brittle, and have little resistance to cracking, thereby causing premature breakage of the composite material.

It has been found that, in accordance with a preferred embodiment of the invention, strips previously encased in aluminum in accordance with the method disclosed in the aforementioned French patent application whereby the bond between the steel and the aluminum casing is of a metallurgical nature, the mechanical properties of the composite materials embodying the features of the invention easily attain the theoretical characteristics calculated by means of Formulae 1 and 2. Substantially, the same results are achieved by using steel strips encased in aluminum by depositing aluminum on the steel under vacuum in accordance to methods known to those skilled in the art.

A composite in accordance with the present invention is formed by arranging the aluminum and thin steel strips in flat layers on top of each other. The strips are substantially parallel to each other in a side-by-side relation, and adjacent layers are relatively offset by about half the widths of a strip. The layers of encased strips may or may not be separated by sheets of aluminum. The resulting assembly is then compressed, pressed or hot-rolled under pressure at elevated pressures to ensure a metallurgical bond between the thin steel strips and the aluminum matrix by metallic interdiffusion between aluminum sheets and the aluminum of the encased steel strips. It is generally preferred to process the assembly at a temperature in the range of 400° C. to 520° C. and at a pressure within the range of 15 h bar to 30 h bar, and preferably in the range of 18 to 25 h bar.

If hot pressing is used, the composite material should be maintained at the selected temperature for a period of at least 20 minutes. It is generally preferred that the period of hot pressing not exceed 60 minutes in order to minimize the formation of intermetallic compounds of the Fe2Al5 type.

If hot rolling is used to process the composite, the reduction in thickness of the composite material in the first pass through the roller should be greater than 10%, and preferably from 10% to 20% so that the aluminum-aluminum bond will be formed in the first pass, with the reduction in thickness being determined by the ratio between the reduction in thickness after rolling and the initial thickness of the assembly to be rolled. However, in order to minimize cracking of the steel strips, the total reduction in thickness of the assembly after the rolling operation has been completed should not exceed certain limits which depend upon the ductility of the steel used. In most cases, this reduction limit is about 50%.

The resulting aluminum-steel composite materials have excellent mechanical properties under traction and bending and yet have a relatively low density. For example, a structural beam weighing 1 ton embodying the features of this invention will comprise 0.66 ton of aluminum and 0.34 ton of martensite steel and have a rupture strength of about 80 h bar and a relative density of approximately 4.4.

The resulting composite materials are particularly well-suited for use in the construction of strong light structures such as airplanes and other types of aircraft, and various vehicles as well as armor plating for vehicles.

The following examples are provided by way of illustration and not by way of limitation of the principal concepts of the present invention.

EXAMPLE 1

Strips of "17/7" steel containing 17% chromium and 7% nickel by weight and having a width of 4 mm. and a thickness of 0.06 mm. are employed in forming a composite according to the concepts of the invention. The initial rupture strength of the steel strips is 185 h bar, and the strips are encased with 99.5% pure aluminum in accordance with the method described in the aforementioned French application with the aluminum layer encasing the steel strips having a thickness of 0.06 mm. The strips are degreased with trichloroethylene, and are cut into lengths of 500 mm. each. The strips are then placed in a side-by-side relation in a steel mold in 10 flat layers, each layer containing 50 strips spaced about 0.1 to 0.2 mm. from the adjacent layer. The layers of steel strips are superposed and aluminum sheets, which have a thickness of 0.1 mm., a length of 500 mm., and a width of 210 mm. and which have been previously degreased, are interposed between the layers of steel strips, with care being taken to ensure that each layer of strips is alternately offset by a distance equal to about 2 mm. in the transverse direction. Aluminum sheets are placed above and below the assembly comprising the layers of steel strips and aluminum sheets, and the assembly is cold compressed in its mold under a pressure of 10 h bar for several minutes. Thereafter, the assembly in the mold is heated in a furnace to a temperature of 480° C., and is compressed at this temperature in a press in which the plates have been heated to 480° C. under the pressure of 20 h bar for 30 minutes. During the pressing operation, the temperature of the assembly varies by ±10° C. and the pressure varies by ±0.5 h bar. After cooling, the assembly is removed from the mold and trimmed to provide a composite plate having a length of about 500 mm., a width of about 210 mm. and a thickness of about 2.6 mm. The relative density of the composite material is 3.8. The composite is tested for rupture by a force applied in a direction longitudinal to the steel strips and in a direction transverse to the steel strips with the following results:

Rc is from 25 to 30 h bar
R is from 40 to 45 h bar.

These values are close to the theoretical values calculated by means of Formulas 1 and 2.

Figure 2:
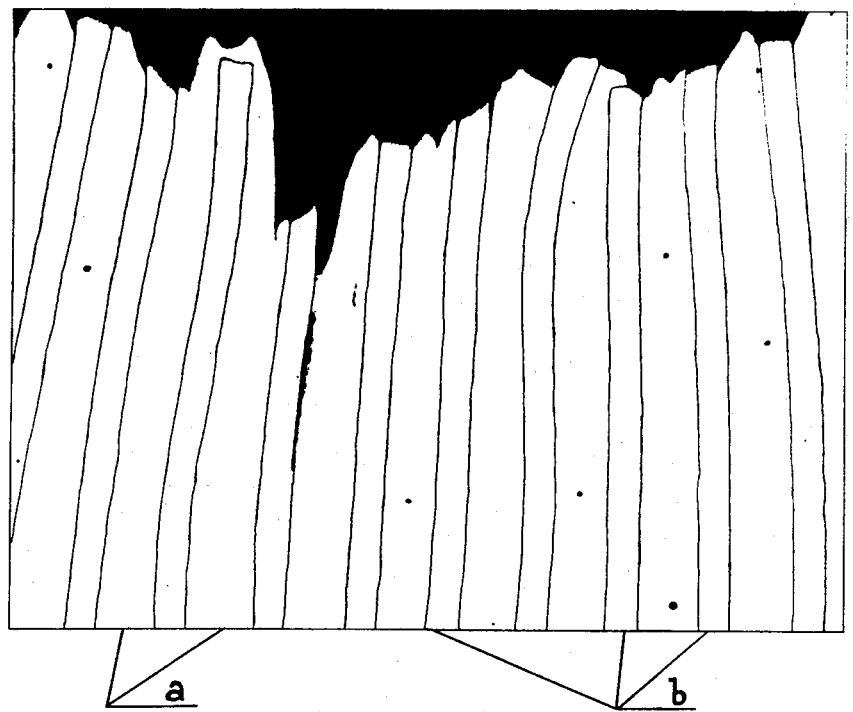
FIG. 2 is the same view as FIG. 1, showing the effect on the composite of FIG. 1 of a transverse rupture.

It is also found that the aluminum-steel bond is of high quality as the breakage surface of the testpieces passes through both the aluminum matrix and the steel strips in the case of testpieces subjected to a force transverse to the direction of the steel strips, as is shown in FIG. 2.

By way of comparison, a composite material formed of a sheet of 99.5% pure aluminum has a transverse rupture strength of the order of 10 h bar with the relative density of the aluminum being 2.7. A composite material formed of stainless ferrite steel containing about 13% by weight chromium has a relative density of the order of 7.85 and a rupture strength in the transverse direction of about 50 h bar.

EXAMPLE 2

The assembly formed in Example 1 is used in this example and is reheated, after the assembly is removed from the mold to a temperature of 500° C. As soon as the central region of the assembly reaches this temperature, it is rolled by conventional methods with the gap between the cylinders of the rolling mill being set at about 2.4 mm. for the first pass, 2.2 mm. for the second pass and about 2 mm. for the third and last pass. The temperature of the plates after the third pass is not higher than 400° C. After trimming, the composite plate has a thickness of about 2.05 mm., a length of about 400 mm. and a width of about 210 mm. The relative density of the composite material is about 4.2 and traction tests reveal the following results:

Rc is from 32 to 35 h bar
R is from 51 to 55 h bar.

EXAMPLE 3

Bare steel strips of the type used in Example 1 are encased with an alloy of the Al-Zn-Mg type referred to as A-Z5G, containing 4.8% by weight zinc, 1.2% magnesium, 0.2% by weight chromium, with the remainder being 99.5% by weight aluminum with its usual impurities. When hardened and tempered, this alloy has a rupture strength of 30 h bar and a relative density of about 2.7.

A composite material is formed by the same method as shown in Example 1 except that the aluminum sheets are replaced by sheets of aluminum the A-Z5G type.

The assembly is removed from the mold, reheated to 450° C. for 10 minutes, subjected to mist quenching and is aged at 120° C. for 20 hours. The composite has the following characteristics:

Rc is from 40 to 43 h bar
R is from 52 to 56 h bar
Relative density is about 2.9.

EXAMPLE 4

Bare steel strips of "17/7" steel used in Example 1 are encased in aluminum by depositing an aluminum layer under vacuum such that the layer has a thickness of about 2 microns. A composite of the type described in Example 1 is produced by using interposed aluminum sheets having a thickness greater than the thickness of the steel strips in order to retain the same steel-aluminum ratio by volume. Since the aluminum layer on the thin steel strips is thin, the assembly is subjected to a hot pressing operation of 500° C. at a pressure of 24 h bar for 30 minutes to form a solid bond between the layers of strips and sheets of aluminum. The mechanical properties of the composite plate thus produced are approximately the same as those of the plate produced in Example 1, and have the following characteristics:

Rc is from 25 to 30 h bar
R is from 40 to 45 h bar.

It will be apparent that we have provided a new and improved composite material and method for its production wherein the composite material has substantial isotropic properties in that the rupture strength of the composite material is substantially the same in a direction transverse to the direction of the reinforcements as the rupture strength in a direction which is the same as the direction of the reinforcements.

It will be understood that changes may be made in the details of construction, method of production and use without departing from the spirit of the invention, especially as defined in the following claims.

We claim:

1. A metal composite comprising a matrix of at least two sheets of aluminum, a plurality of superposed thin strips of steel providing a plurality of layers of said strips, said strips having a thickness less than 0.5 mm. and a width from 15 to 300 times their thickness and being arranged internally in said matrix and being diffusion bonded to said sheets to form a composite material having substantially isotropic properties.

2. A composite as defined in claim 1 wherein said strips have a rectangular cross section.

3. A composite as defined in claim 1 wherein at least one additional sheet of aluminum is interposed between at least two of said layers.

4. A composite as defined in claim 1 wherein said strips have a thickness in the range of 0.05 to 0.15 mm. and a width from 30 to 200 times their thickness.

5. A composite as defined in claim 1 wherein said strips are encased in aluminum.

6. A composite as defined in claim 1 wherein said strips on one of said layers are substantially parallel to said strips on an adjacent layer.

7. A composite as defined in claim 1 wherein said strips on one of said layers are substantially transverse to said strips on an adjacent layer.

8. A composite as defined in claim 1 wherein said strips occupy between 10 and 70% of the volume of said matrix.

9. A composite as defined in claim 1 wherein said strips occupy between 20 to 50% of the volume of said matrix.

10. A composite as defined in claim 1 wherein an intermixture of said metals is formed by diffusion having a thickness of less than 2 microns.

11. A composite as defined in claim 1 wherein said first metal is an aluminum alloy selected from the group consisting of Al-Si, Al-Zn-Mg, Al-Mg-Si and Al-Zn-Mg-Cu alloys.

References Cited

UNITED STATES PATENTS

| | | | |
|---|---|---|---|
| 1,815,187 | 7/1931 | Coles | 29—191.4 |
| 3,406,446 | 10/1968 | Muldovan | 29—196.2 X |
| 3,419,952 | 1/1969 | Carlson | 29—191.4 X |

L. DEWAYNE RUTLEDGE, Primary Examiner

J. M. DAVIS, Assistant Examiner

U.S. Cl. X.R.

29—191.4, 472.3